US012589652B2

(12) United States Patent
Hasegawa

(10) Patent No.: US 12,589,652 B2
(45) Date of Patent: Mar. 31, 2026

(54) CONTROL SYSTEM FOR LIGHT TRANSMISSION SWITCH

(71) Applicant: TOYOTA JIDOSHA KABUSHIKI KAISHA, Toyota (JP)

(72) Inventor: Shohei Hasegawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 56 days.

(21) Appl. No.: 18/903,441

(22) Filed: Oct. 1, 2024

(65) Prior Publication Data

US 2025/0229629 A1     Jul. 17, 2025

(30) Foreign Application Priority Data

Jan. 17, 2024     (JP) ................................. 2024-005146

(51) Int. Cl.
  *B60K 35/10*          (2024.01)
  *B60H 1/00*           (2006.01)
(52) U.S. Cl.
  CPC ......... *B60K 35/10* (2024.01); *B60H 1/00742*
    (2013.01); *B60K 2360/131* (2024.01); *B60K 2360/148* (2024.01); *B60K 2360/345* (2024.01); *B60K 2360/741* (2024.01)
(58) Field of Classification Search
  CPC ............. B60Q 3/14; B60Q 3/18; H05B 47/12
  USPC ......................................................... 701/36
  See application file for complete search history.

(56) References Cited

U.S. PATENT DOCUMENTS

2018/0177029 A1*   6/2018   Wang ................... H05B 47/197

FOREIGN PATENT DOCUMENTS

JP        2020-024832 A      2/2020
JP         2020131830 A   *  8/2020

OTHER PUBLICATIONS

Machine Translation JP2020131830 (Year: 2020).*

* cited by examiner

*Primary Examiner* — Navid Z. Mehdizadeh
*Assistant Examiner* — Vincent Feng
(74) *Attorney, Agent, or Firm* — SoraIP, Inc.

(57)     ABSTRACT

Each of a plurality of light transmission switches includes a translucent region that allows light from a light source to pass through a surface of an instrument panel into a vehicle cabin, and an opaque region that blocks passage of the light into the vehicle cabin. It is determined, for each of the light transmission switches, whether a current situation is a situation in which an occupant makes a turn-on request to turn on the light transmission switch, or whether a current vehicle state is a vehicle state that allows turning on of the light transmission switch. At least one light transmission switch selected from the light transmission switches based on a determination result is switched to an on state. This makes it possible to achieve both convenience for the occupant to perform the switch operations and good interior design of the vehicle cabin.

5 Claims, 6 Drawing Sheets

FIG. 3

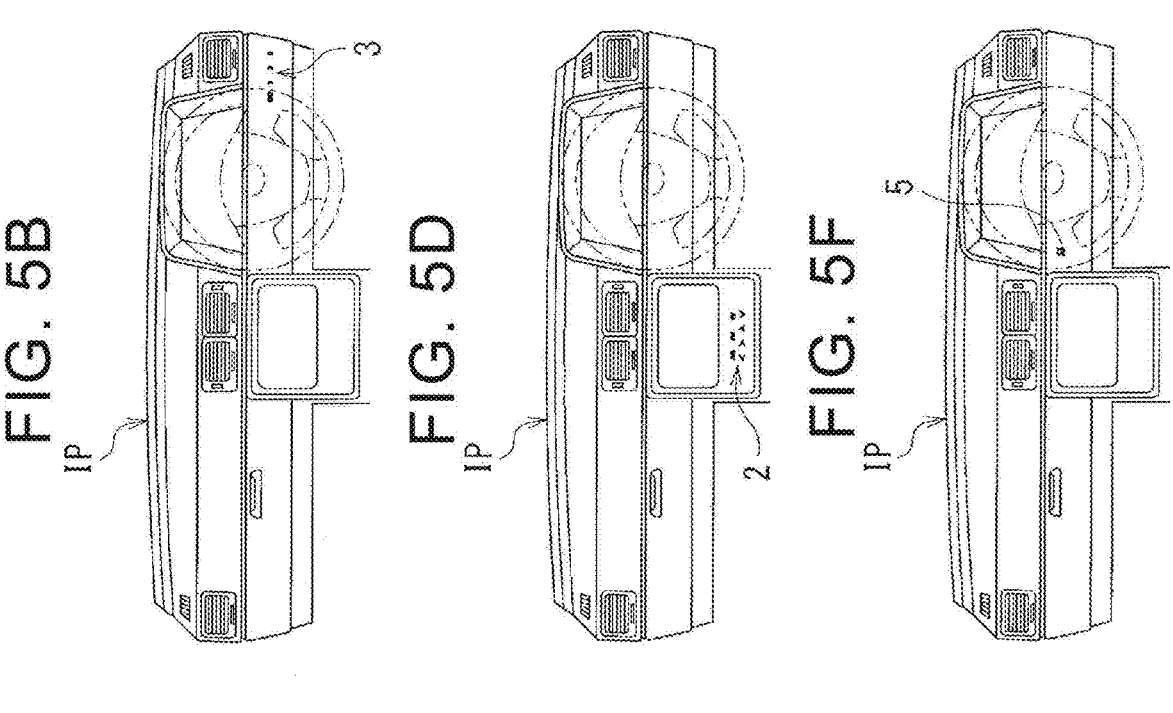
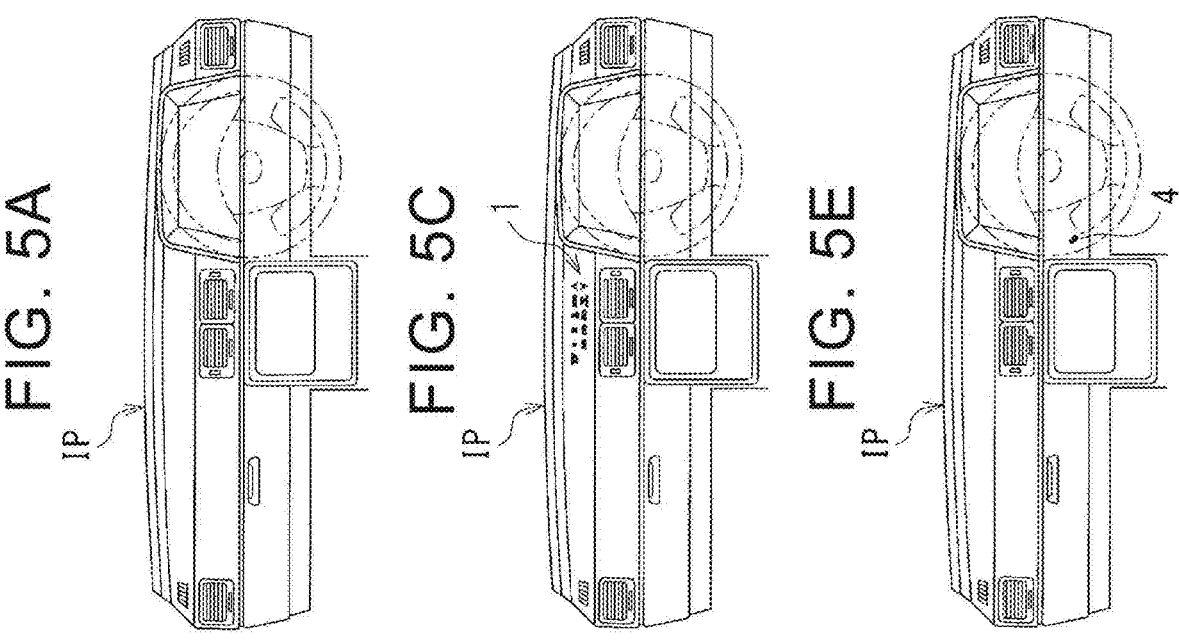

CONTROL SYSTEM FOR LIGHT TRANSMISSION SWITCH

CROSS-REFERENCE TO RELATED APPLICATION

This application claims priority to Japanese Patent Application No. 2024-005146 filed on Jan. 17, 2024, incorporated herein by reference in its entirety.

BACKGROUND

1. Technical Field

The present disclosure relates to control systems for light transmission switches. More particularly, the present disclosure relates to improvement in control of turning on a plurality of light transmission switches mounted in a vehicle cabin.

2. Description of Related Art

Conventionally, a plurality of switches for operating in-vehicle devices such as an air conditioner (car air conditioner) or enabling various driver assist functions is mounted on an instrument panel, a center console, etc. in a vehicle cabin of a vehicle.

Japanese Unexamined Patent Application Publication No. 2020-24832 (JP 2020-24832 A) discloses a light transmission switch. This light transmission switch contains a light source. When the light source emits light, a figure (hereinafter also referred to as "symbol") corresponding to the type of the switch is lit (the shape of the symbol appears) on an instrument panel.

As a specific configuration of the light transmission switch disclosed in JP 2020-24832 A, a switch member is provided, and a cushioning layer is provided on a surface of a base member and a surface of the switch member. The switch member and the light source are disposed inside an opening formed in the base material of the instrument panel, and the switch member is translucent (has light transmitting properties). A region of the cushioning layer that is located exactly on top of the switch member is made of a translucent silicone resin, and a decorative layer is provided on a surface of the silicone resin. The decorative layer includes a coating-removed portion having the same shape as that of the symbol. The entire surface of the cushioning layer is covered with translucent upholstery. Therefore, when the light source is caused to emit light, the light from the light source passes through the switch member, the silicone resin of the cushioning layer, the coating-removed portion of the decorative layer, and the upholstery. As a result, the symbol is lit (the shape of the symbols appears) on the instrument panel, so that an occupant can recognize (visually recognize) the type and position of the switch.

SUMMARY

However, J P 2020-24832 A does not at all mention control of turning on and off such light transmission switches. Therefore, it is assumed that all the light transmission switches are always on while a vehicle system is in an ON state (e.g., an ignition ON state).

A situation where all the light transmission switches are always on is a situation where the symbols of all the light transmission switches are always lit regardless of whether the occupant need to operate them. This gives a complex impression on the interior of the vehicle cabin (in particular, near the instrument panel or the center console). One possible solution to this is to make all the light transmission switches always off. However, this requires the occupant to memorize the positions of all the light transmission switches in advance, which is not practical. Therefore, there is room for improvement in terms of achieving both convenience for the occupant to perform switch operations and good interior design of the vehicle cabin.

The present disclosure was made in view of the above circumstances, and an object of the present disclosure is to provide a control system for a light transmission switch that can achieve both convenience for an occupant to perform switch operations and good interior design of a vehicle cabin.

In order to achieve the above object, the present disclosure provides a control system for a light transmission switch that is configured to control turning on of a plurality of light transmission switches. Each of the light transmission switches includes a translucent region that allows light from a built-in light source to pass through a surface of a vehicle cabin interior material into a vehicle cabin, and an opaque region that blocks passage of the light into the vehicle cabin.

This control system is characterized by including a selective turn-on control unit configured to: determine, for each of the light transmission switches that are in a non-on state, whether a current situation is a situation in which an occupant makes a turn-on request to turn on the light transmission switch, or whether a current vehicle state is a vehicle state that allows turning on of the light transmission switch; and switch at least one light transmission switch selected from the light transmission switches based on a determination result to an on state in which the light is allowed to pass through the translucent region into the vehicle cabin.

According to this specific matter, in the case where a light transmission switch is in the non-on state when the current situation is a situation in which the occupant makes a turn-on request to turn on this light transmission switch or when the current vehicle state is a vehicle state that allows turning on of this light transmission switch, this light transmission switch is selectively switched to the on state. This allows only the minimum necessary light transmission switch(es) to be switched to the on state, and therefore can maintain good interior design of the vehicle cabin while allowing the light transmission switch(es) that satisfies an operation request from the occupant or the light transmission switch(es) that is suitable for the vehicle state to be switched to the on state.

The light transmission switches may be seat memory switches configured to move a seat according to a seat position stored in advance, and the situation in which the occupant makes the turn-on request may be a situation in which the occupant is seated in the seat.

With this configuration, the seat memory switches are switched to the on state as soon as the occupant is seated in the seat. Accordingly, it is possible to satisfactorily respond to a request from the occupant seated in the seat (turn-on request to turn on the seat memory switches to be operated to move the seat to the seat position registered in advance).

The light transmission switches may be light transmission switches for an air conditioning system that are configured to operate an air conditioner, and the situation in which the occupant makes the turn-on request may be a situation in which a body temperature of the occupant is out of a predetermined range.

With this configuration, it is possible to satisfactorily respond to a request from the occupant who wants to operate the light transmission switches for the air conditioner system in order to fulfill an air conditioning request from the occupant (cooling request when the body temperature of the occupant is high, or heating request when the body temperature of the occupant is low).

The light transmission switches may be light transmission switches configured to enable a driver assist function, and the vehicle state that allows turning on of the light transmission switch may be a state in which a vehicle condition that allows enabling of the driver assist function is satisfied.

With this configuration, the light transmission switches configured to enable the driver assist function are switched to the on state as soon as the vehicle state becomes the state in which the vehicle condition that allows enabling of the driver assist function is satisfied. Accordingly, it is possible to satisfactorily respond to a request from the driver to operate the light transmission switches configured to enable the driver assist function.

The control system may further include a voice recognition unit configured to recognize a voice of the occupant. The situation in which the occupant makes the turn-on request may be when the voice of the occupant recognized by the voice recognition unit is a voice requesting to turn on a specific light transmission switch.

With this configuration, when the occupant wants to operate a light transmission switch in a situation in which the light transmission switches are in the non-on state, it is possible to switch the requested light transmission switch to the on state by causing the voice recognition unit to recognize the request by voice. Accordingly, the occupant can easily recognize the position of the light transmission switch that he/she wants to operate only by speaking.

In the present disclosure, at least one light transmission switch selected from the light transmission switches in the non-on state is switched to the on state based on the determination result. The determination result includes the result of determining whether the current situation is the situation in which the occupant makes a turn-on request, or the result of determining whether the current vehicle state is the vehicle state that allows turning on of the light transmission switch. This makes it possible to achieve both convenience for the occupant to perform the switch operations and good interior design of the vehicle cabin.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a block diagram illustrating a schematic configuration of a control system of the light transmission switch according to the embodiment;

FIG. 5A is a front view of the instrument panel according to an embodiment, showing the off state of all the light transmission switches;

FIG. 5B is a front view of the instrument panel according to an embodiment and is a view showing a condition in which only the seat memory switch is lit;

FIG. 5C is a front view of the instrument panel according to the embodiment, a diagram showing a state in which only the light transmission switches of the air conditioner system are on;

FIG. 5D is a front view of the instrument panel according to an embodiment, showing a state in which only light transmission switches of an audio system are on;

FIG. 5E is a front view of the instrument panel according to an embodiment, and is a diagram showing a state in which only a parking assist switch is on;

FIG. 5F is a front view of the instrument panel according to an embodiment of the present, showing a state in which only a panoramic view monitor is on.

DETAILED DESCRIPTION OF EMBODIMENTS

Hereinafter, an embodiment of the present disclosure will be described with reference to the drawings. In the present embodiment, a case will be described in which the present disclosure is applied to a configuration in which a plurality of light transmission switches is built in an instrument panel in a vehicle cabin.

Arrangement of Light Transmission Switch

Figures 1A, 1B, 1C, 1D, 1E:
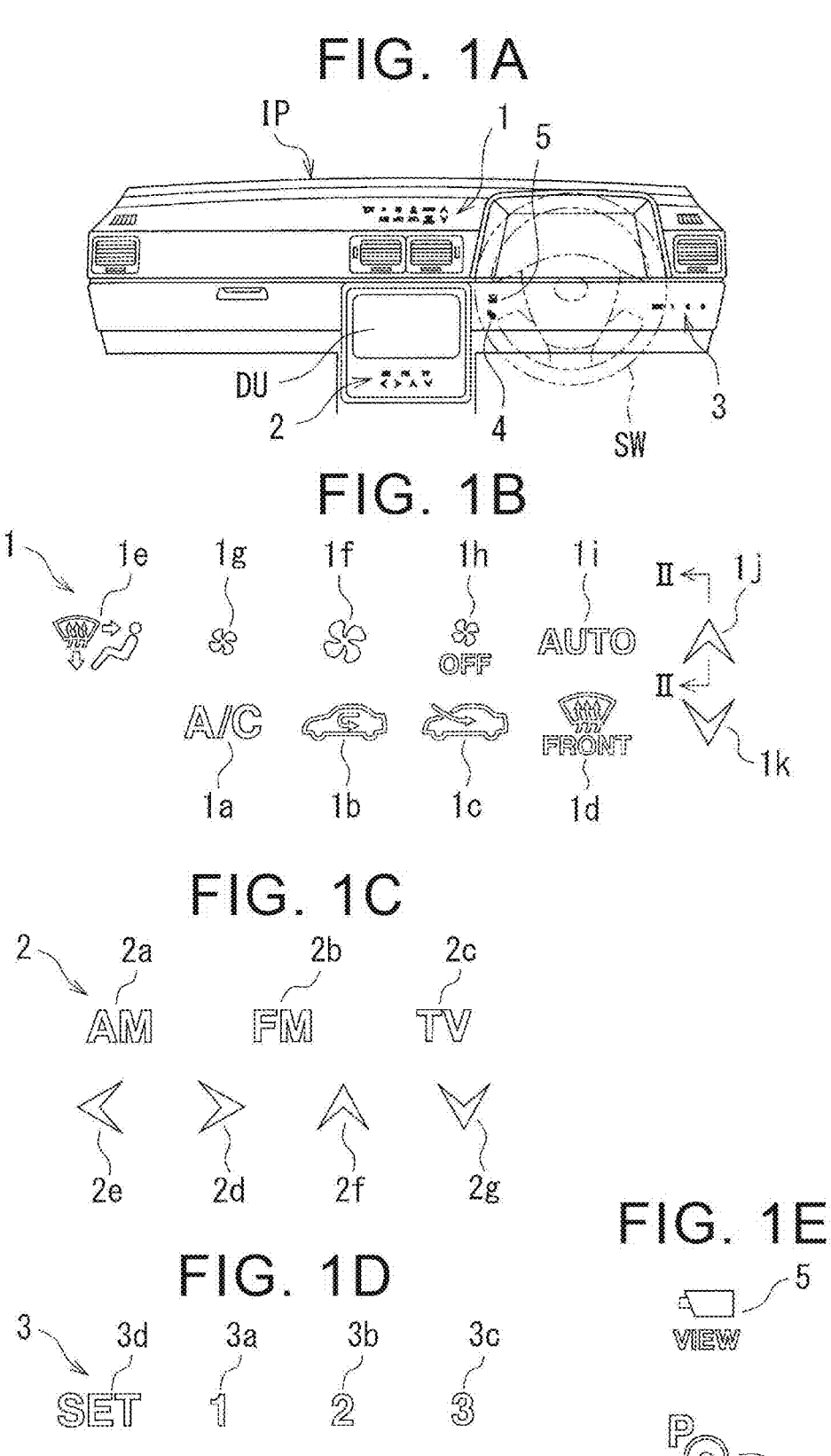
FIG. 1A is a diagram showing an on state of light transmission switches built in an instrument panel according to the embodiment, is a front view of the instrument panel.
FIG. 1B is a diagram illustrating an on state of light transmission switches built in the instrument panel according to an embodiment, and is an enlarged view illustrating an on state of light transmission switches of an air conditioner system.
FIG. 1C is a diagram illustrating an on state of light transmission switches built in the instrument panel according to an embodiment, and an enlarged view illustrating an on state of a light transmission switch of an audio system.
FIG. 1D is a diagram illustrating an on state of light transmission switches built in the instrument panel according to an embodiment, and is an enlarged view illustrating an on state of a seat memory switch.
FIG. 1E is an enlarged view showing an on state of a parking assist switch and a panoramic view monitor switch.

FIG. 1A is a front view of an instrument panel (vehicle cabin interior material) IP in which each light transmission switch 1, 2, 3, 4, 5 according to the present embodiment is built, showing the on state of the light transmission switches 1 to 5. FIG. 1B is an enlarged view showing the on state of the light transmission switches 1 of the air conditioner system (1a to 1k). FIG. 1C is an enlarged view showing the on state of the light transmission switches 2 of the audio system (2a to 2g). FIG. 1D is an enlarged view showing the on state of the seat memory switches 3 (3a to 3d). FIG. 1E is an enlarged view showing the on state of the parking assist switch 4 and the panoramic view monitor switch 5.

As shown in FIG. 1A, the instrument panel IP according to the present embodiment is provided with a light transmission switch 1 of the air conditioner system (1a to 1k) (built in an instrument panel IP) at a central portion thereof (a central portion in a vehicle width direction). In the instrument panel IP according to the present embodiment, a light transmission switch 2 of the audio system (2a to 2g) is disposed at a central portion thereof. Further, the instrument panel IP is provided with a seat memory switch 3 (3a to 3d) (built in the instrument panel IP) as a light transmission switch. The seat memory switch 3 is disposed at a position closer to the driver's seat in the instrument panel IP and further outward in the vehicle widthwise direction than the steering wheel SW (shown in phantom in FIG. 1A). Further, the instrument panel IP is provided with a parking assist switch 4 and a panoramic view monitor switch 5 (built in the instrument panel IP). These are disposed at positions closer to the driver's seat in the instrument panel IP and at positions closer to the vehicle-width-direction inner side than the steering wheel SW. These light transmission switches 1 to 5 are built in the instrument panel IP. Therefore, as will be described later, it is operated by pushing the skin material 63 (see FIG. 2) of the instrument panel IP corresponding to each of the light transmission switches 1 to 5. The arrangement of the light transmission switches 1 to 5 is not limited to that shown in FIG. 1A. The types and numbers of the light transmission switches 1 to 5 are not limited to those shown in FIG. 1A.

The light transmission switch 1 of the air conditioner system includes an air conditioner switch (compressor operation switch) 1*a*, an inside air circulation mode switch 1*b*, an outside air introduction mode switch 1*c*, a front defroster switch 1*d*, and a blowout mode switch 1*e*. Further, as the light transmission switch 1 of the air conditioner system, further, an air volume increase switch if, an air volume decrease switch 1*g*, OFF switch 1*h*, an auto switch 1*i*, a set temperature UP switch 1*j*, a set temperature DOWN switch 1*k*.

The air conditioner switch 1*a* is a switch for switching ON/OFF of a compressor provided in a coolant circulation circuit of an air conditioner (not shown). The inside air circulation mode switch 1*b* is a switch for setting air to be taken into the air conditioner (air to be air-conditioned) as the air in the vehicle cabin. The outside air introduction-mode switch 1*c* is a switch for making the air to be taken into the air conditioner as the outside air. The front defroster switch 1*d* is a switch that is pressed when it is desired to remove fogging of the windshield. By pressing the front defroster switch 1*d*, the compressor is operated to circulate the refrigerant in the refrigerant circulation circuit, and the air-conditioned air is dehumidified. Further, the air-conditioning air blowing mode is set to the defroster mode. The blow-out mode switch 1*e* is a switch for changing the blow-out port of the air-conditioned air blown into the vehicle cabin, and each time the switch is pressed, the blow-out mode is switched in the order of the face mode, the bi-level mode, the foot mode, and the foot differential mode. The air volume increase switch if is a switch that is pressed when an increase in the blowout volume of the air-conditioned air is required. The air volume decrease switch 1*g* is a switch that is pressed when a reduction in the amount of air blown out of the air-conditioned air is required. OFF switch 1*h* is a switch that is pressed when the air conditioner is stopped. The auto switch 1*i* is a switch that is operated when the air conditioner is automatically controlled. When the auto-switch 1*i* is turned ON, the air conditioner is automatically controlled based on the temperature in the vehicle cabin, the set temperature, and the like. The set temperature UP switch 1*j* is a switch for increasing the set temperature of the air conditioner (target temperature of the air conditioning air). The set temperature DOWN switch 1*k* is a switch for lowering the set temperature of the air conditioner. As shown in FIG. 1B, these light transmission switches 1 (1*a* to 1*k*) are such that, when in the on state, individual symbols are lit (the shapes of the symbols appear on the instrument panel IP). A configuration for causing the symbols to appear on the instrument panel IP will be described later.

The light transmission switch 2 of the audio system includes a AM radio switch 2*a*, FM radio switch 2*b*, TV switch 2*c* as a source selection switch. The light transmission switch 2 of the audio system also includes a channel feed switch 2*d*, a channel return switch 2*e*, a volume UP switch 2*f*, and a volume DOWN switch 2*g*.

AM radio switch 2*a* is a switch that is pressed when listening to AM radio, FM radio switch 2*b* is a switch that is pressed when listening to FM radio, and TV switch 2*c* is a switch that is pressed when viewing TV. The channel feed switch 2*d* is a switch for postponing a channel when selecting each radio or television, and the channel return switch 2*e* is a switch for returning a channel when selecting each radio or television. The volume UP switch 2*f* is a switch for increasing the volume of the audio system. The volume DOWN switch 2*g* is a switch for reducing the volume of the audio system. As shown in FIG. 1C, these light transmission switch 2*a* to 2*g* are also such that their individual symbols are lit when the light transmission switches 2*a* to 2*g* are in the on state.

The seat memory switch 3 is a switch for moving a seat (driver's seat) to a seat position stored in advance, and is used in a stopped state of the vehicle. The seat memory switch according to the present embodiment includes three position switches 3*a*, 3*b*, 3*c* and a set switch 3*d* for setting (registering) the positions.

Each of the position switches 3*a*, 3*b*, 3*c* is a switch for reading one of the seat positions registered in advance. That is, the vehicle according to the present embodiment can register three patterns as the seat position. The set switch 3*d* is a switch for registering seat positions. As shown in FIG. 1D, these light transmission switches 3 (3*a* to 3*d*) are switches in which in the lighting condition, those individual symbols are respectively in an on state.

The parking assist switch 4 is a switch for activating a parking assist (automatic parking) function mounted on the vehicle. This parking assist is a function of parking a vehicle in a designated parking area by automatic driving. As shown in FIG. 1E, the parking assist switch 4 is also illuminated when it is in the on state.

The panoramic view monitor switch 5 is a switch for activating a panoramic view monitor function mounted on the vehicle. This panoramic view monitor is a function of displaying images enabling the surroundings of the vehicle to be checked from a viewpoint from above the vehicle on a display device DU in the vehicle cabin, and is used for driving assistance of the driver. The panoramic view monitor displays, on a display device DU in the vehicle cabin, an image that enables the surroundings of the vehicle to be confirmed from a viewpoint from above the vehicle by combining a plurality of images of an external camera of the vehicle (not shown). As shown in FIG. 1E, the symbol of the panoramic view monitor switch 5 is lit when the panoramic view monitor switch 5 is in the on state.

Configuration of the Light Transmission Switch

Next, the configuration of the light transmission switches 1 to 5 will be described. Since the configurations of the light transmission switches 1 to 5 are substantially the same, one light transmission switch 1 will be described as an example.

Figure 2:
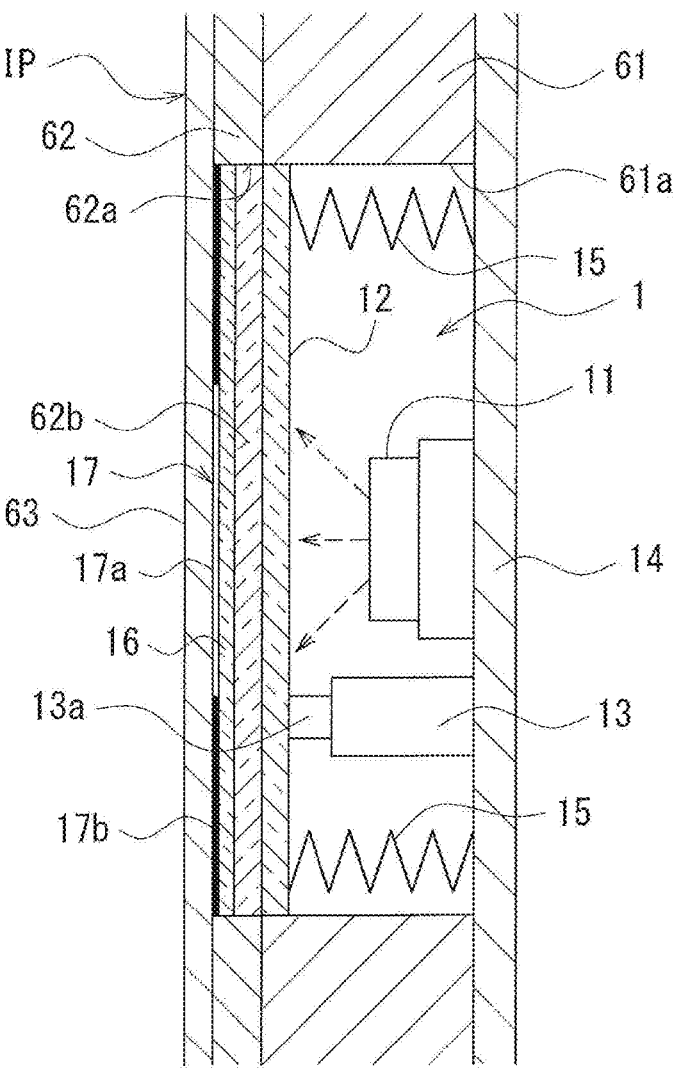
FIG. 2 is a sectional view of the light transmission switch taken along II-II line in FIG. 1B.

FIG. 2 is a cross-sectional view of the light transmission switch 1 taken along II-II line in FIG. 1B. As shown in FIG. 2, the light transmission switch 1 is disposed so as to be embedded in the instrument panel IP. Specifically, the basic structure of the instrument panel IP includes a resin-made non-light-transmitting base material 61, a cushion material 62 disposed on the surface of the base material 61, and a light-transmitting (light-transmitting) skin material 63 disposed on the surface of the cushion material 62.

The base material 61 is made of, for example, polypropylene (PP) or polyethylene terephthalate (PET). A switch accommodating opening 61*a* that opens from one end side (inner side in the vehicle cabin) to the other end side (instrument panel IP inner space side) of the base material 61 is provided at a position where the light transmission switch 1 is disposed in the base material 61. The opening shape of the switch-accommodating opening 61*a* (the shape of the opening viewed from a direction perpendicular to the surface of the instrument panel IP) is a circular shape or a polygonal shape.

Inside the switch accommodating opening 61*a* of the base material 61, a light source 11 constituting the main part of the light transmission switch 1, a switch panel 12, for example, an alternate type switch member 13 is accommodated.

The light source 11 is mounted on a circuit board 14 attached to the back surface side (the inner space side of the instrument panel IP) of the base material 61, and is made of, for example, LED (Light Emitting Diode).

The switch panel 12 is formed of a flat plate having a light-transmitting property substantially matching the shape of the switch accommodating opening 61*a* of the base material 61. The switch panel 12 is biased toward the skin material 63 of the instrument panel IP by a plurality of springs 15 and 15 disposed between the switch panel and the circuit board 14. The biasing force of the springs 15 and 15 is set in advance so that the surface of the skin material 63 becomes flat (such that the surface of the skin material 63 becomes flat in a state where the light transmission switch 1 is not operated).

The switch member 13 is mounted on the circuit board 14. The switch member 13 has a pushing member 13*a* that is pushed in by receiving a pushing operating force from the skin material 63. When the light transmission switch 1 is not operated, the front end surface of the pushing member 13*a* is opposed to the rear surface of the switch panel 12 with a small distance therebetween. When the light transmission switch is operated, the pushing member 13*a* is pushed in. Along with this, operation switching of the in-vehicle device (such as an air conditioner and an audio system) and activation of the driving support function (such as a parking assist function and a panoramic view monitor function) according to the operation of the light transmission switch are performed.

The cushion material 62 is provided with an opening 62*a* at a position facing the switch panel 12. The shape of the opening 62*a* substantially matches the shape of the switch panel 12. The opening 62*a* is provided with a light-transmitting member 62*b* having a light-transmitting property. The light-transmitting member 62*b* is made of, for example, a silicone resin.

A proximity detection member (detecting unit) 16 is provided on the front surface of the light-transmitting member 62*b* for detecting the approach or touch of the hand (finger) of the occupant. The proximity detection member 16 also has a light-transmitting property similar to that of the above-described switch panel 12. As the proximity detection member 16, for example, a well-known hover sensor can be applied. Specifically, the proximity detection member 16 is connected to an aggregation ECU 160 (see FIG. 3) to be described later by a signal line. A voltage is applied to the proximity detection member 16 from the aggregation ECU 160 so that electric charges are charged, and the capacitance can be detected by detecting the voltage of the proximity detection member 16. By such a self-capacitance type capacitance detection, the capacitance value changes when a detection object such as a finger of an occupant comes close to or comes into contact with the light transmission switch 1 (comes into contact with the skin material 63). As a result, it is possible to determine whether or not the object to be detected is close to or in contact with, and it is possible to detect the proximity.

A decorative layer 17 is provided on the surface of the proximity detection member 16. The decorative layers 17 are formed with peeling portions 17*a* corresponding to the above-described shapes of the symbols. Specifically, a coating film 17*b* is formed on the surface of the proximity detection member 16 by coating, and a portion of the coating film 17*b* is peeled off by lasers or the like, so that the peeling portion 17*a* having a light-transmitting property is formed in a shape matching the shape of the symbol. The decorative layers 17 are composed of the peeling portions 17*a* and the coating film 17*b*. As a result, the peeling portion 17*a* constitutes a translucent region according to the present disclosure (translucent region that allows light from the light source to pass through the surface of the vehicle cabin interior material into the vehicle cabin). The coating film 17*b* constitutes the opaque region according to the present disclosure (opaque region that blocks passage of light from the light source into the vehicle cabin).

The skin material 63 is disposed so as to cover the entire surface of the cushion material 62 and the decorative layer 17, and the entire skin material is adhered to the cushion material 62, and the terminal thereof is fixed in a state of being caught in the back side of the base material 61. Note that the entire skin material 63 may have light transmitting properties, or only a region facing each of the light transmission switches 1 to (a region facing the switch panel 12) may have a light-transmitting property.

With the light transmission switch 1 configured in this way, when the light source 11 emits light, the light reaches the decorative layers 17 via the switch panel 12, the light transmitting member 62*b*, and the proximity detection member 16. In the decorative layer 17, the permeation is blocked by the coating film 17*b*, and the permeation is transmitted through the peeling portion 17*a*. As a result, the light transmitted through the peeling portion 17*a* (the light transmitted in the symbolic form) also passes through the skin material 63. As a result, the symbols are illuminated on the instrument panel IP (the shapes of the symbols are raised). Therefore, the occupant can recognize (visually recognize) the type and position of the light transmission switch 1.

Schematic Configuration of the Control System

Figure 3:
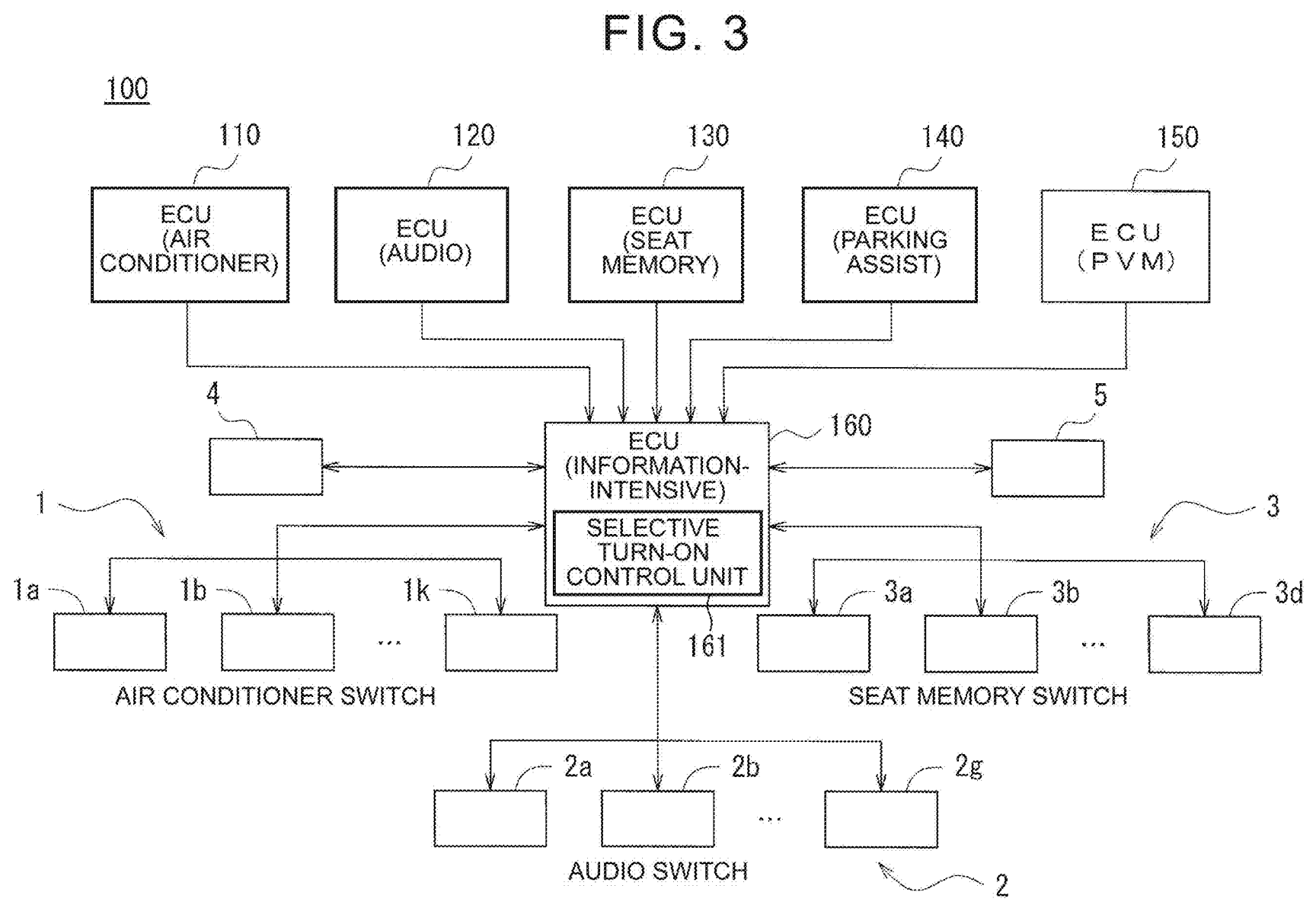

Next, a control system for controlling the on state and off state (non-on state) of each of the light transmission switches 1 to 5 will be described. FIG. 3 is a block diagram illustrating a schematic configuration of the control system 100 of the light transmission switches 1 to 5 according to the present embodiment.

As shown in FIG. 3, the control system 100 includes ECU 110, 120, 130, 140, 150, an aggregation ECU 160, and the light transmission switches 1 to 5. Each ECU 110, 120, 130, 140, 150 controls an in-vehicle device and a driving assistance function according to the manipulation of each of the light transmission switches 1 to 5. The in-vehicle device includes an air conditioner, an audio system, a seat memory system, and the like. The driving support function includes a parking assist function, a panoramic view monitor function, and the like. The aggregation ECU 160 aggregates the data from ECU 110 150 to control the on state and off state of the light transmission switches 1 to 5. ECU 110 150 for controlling the in-vehicle device and the driving support function include an air conditioner ECU 110, an audio ECU 120, and a seat memory ECU 130. Further, ECU 110 150 include a parking assist ECU 140 and a panoramic view monitor ECU 150. ECU 110 160 includes, for example, a processor such as a CPU, a ROM for storing a control program, a RAM for temporarily storing data, and an input/output port.

ECU 110 160 and the light transmission switches 1 to 5 are connected by a vehicle-network signal line (CAN (Controller Area Network) signal line or a CXPI (Clock Extension Peripheral Interface) signal line). Thus, ECU 110 160 and the light transmission switches 1 to 5 can transmit and receive data to and from each other. It should be noted that the present disclosure is not limited to this, and an Ethernet (Ethernet), FLEXRAY, LIN (Local Interconnect Network), or the like may be adopted as the vehicle network that enables transmission and reception of information.

The air conditioner ECU 110 controls the air conditioner according to the temperature in the vehicle cabin, the set temperature, and the operation of the light transmission switch 1 (1k from 1a) of the air conditioner system. Further, the air conditioner ECU 110 transmits information on the control state of the air conditioner at present and information used for switching between the on state and off state of the light transmission switch 1 of the air conditioner system (1a to 1k) to the aggregation ECU 160. Examples of the information used to switch between the on state and the off state include body temperature information of the occupant. The temperature information of the occupant is acquired by, for example, an infrared camera installed in the vehicle cabin. That is, the aggregation ECU 160 determines whether there is a possibility that an operation request (a request from an occupant) of the light transmission switch 1 (1a to 1k) of the air conditioner system is generated in accordance with the body temperature of the occupant (in the present disclosure, determines whether a current situation is a situation in which the occupant makes a turn-on request according to the present disclosure). The aggregation ECU 160 is configured to switch between the on state and the off state of the light transmission switch 1 (1a to 1k) of the air conditioner system based on the determination result (described in detail later). Incidentally, as information to be used to switch between the on state and the off state of the light transmission switch 1 of the air conditioner system (1a to 1k), the information is not limited to those described above.

The audio ECU 120 controls the audio system in response to manipulation of the light transmission switch 2 of the audio system (2a to 2g). In addition, the audio ECU 120 transmits information on the control state of the audio system at present and information used for switching between the on state and the off state of the light transmission switch 2 of the audio system (2a to 2g) to the aggregation ECU 160. Examples of the information used for switching between the on state and the off state include reception state information of radio waves of respective sources (AM radio, FM radio, and TV). In other words, the aggregation ECU 160 determines whether there is a possibility that an request (request from an occupant) to operate the light transmission switches 2 of the audio system (2a to 2g) is made according to the reception state of the radio waves of the respective sources (in the present disclosure, determines whether a current situation is a situation in which the occupant makes a turn-on request according to the present disclosure). The aggregation ECU 160 switches between an on state and an off state of the light transmission switch 2 of the audio system (2a to 2g) based on the determination result. It should be noted that the light transmission switch 2 of the audio system (2a to 2g) is not limited to the above information used for switching between the on state and the off state.

The seat memory ECU 130 controls the seat memory system. Further, the seat memory ECU 130 transmits information on the control state of the present seat memory system and information used for switching between the on state and the off state of the seat memory switch 3 (3a to 3d) to the aggregation ECU 160. Examples of the information used to switch between the on state and the off state include seating information in which the driver is seated in the driver's seat. The seating information is acquired by a seating sensor (not shown) provided in the driver's seat. In other words, the aggregation ECU 160 determines whether there is a possibility that an request (request from an occupant) to operate the seat memory switches 3 (3a to 3d) is made according to the seating information (in the present disclosure, determines whether a current situation is a situation in which the occupant makes a turn-on request according to the present disclosure). The aggregation ECU 160 switches between an on state and an off state of the seat memory switch 3 (3a to 3d) based on the determination result. The seat memory switch 3 (3a to 3d) may be switched between an on state and an off state.

The parking assist ECU 140 controls the parking assist function. In addition, the parking assist ECU 140 transmits information on the control state of the present parking assist function and information used for switching between the on state and the off state of the parking assist switch 4 to the aggregation ECU 160. Examples of the information used for switching between the on state and the off state include own-vehicle position information and vehicle speed information. The position of the vehicle is acquired by a GPS received by GPS module. Further, the vehicle speed information is acquired by a vehicle speed sensor (not shown). That is, the aggregation ECU 160 determines whether there is a possibility that a request (request from an occupant) to operate the parking assist switch 4 is made according to the vehicle position information, the vehicle speed information, and the like (in the present disclosure, determines whether a current vehicle state is a vehicle state that allows turning on of the light transmission switch). The aggregation ECU 160 switches between an on state and an off state of the parking assist switch 4 based on the determination result. Note that the information used for switching between the on state and the off state of the parking assist switch 4 is not limited to the information described above.

The panoramic view monitor ECU 150 controls the panoramic view monitor function. In addition, the panoramic view monitor ECU 150 transmits information on a control state of the present panoramic view monitor function and information used for switching between an on state and an off state of the panoramic view monitor switch 5 to the aggregation ECU 160. The information for switching between the on state and the off state includes, for example, own-vehicle position information and vehicle speed information. That is, the aggregation ECU 160 determines whether there is a possibility that a request (request from an occupant) to operate the panoramic view monitor switch 5 is made according to the vehicle position information, the vehicle speed information, and the like (determines whether a current vehicle state is a vehicle state that allows turning on of the light transmission switch according to the present disclosure). The aggregation ECU 160 switches between an on state and an off state of the panoramic view monitor switch 5 based on the determination result. Note that the information used for switching between the on state and the off state of the panoramic view monitor switch 5 is not limited to the information described above.

The aggregation ECU 160 receives data from ECUs 110 to 150 and switches between the on state and the off state of the light transmission switches 1 to 5.

Specifically, the aggregation ECU 160 includes a selective turn-on control unit 161 as a functional unit realized by the control program. The selective turn-on control unit 161 controls the on state and the off state of each of the light transmission switches 1 to 5.

Specifically, when the seating information is received from the seat memory ECU 130, the selective turn-on control unit 161 estimates that the driver's seat is required to adjust the seat position, and transmits the lighting command information to the seat memory switch 3 (3a to 3d). The seating information is information indicating that the driver is seated in the driver's seat. Adjustment of the seat position in the driver's seat is adjustment of the seat position according to the seat memory information stored as the seat position of the driver's seat. As a result, the seat memory switch 3 (3a to 3d) is turned on. Further, the aggregation ECU 160 includes a timer for turning off the seat memory switch 3 (3a to 3d) switched to the on state according to the seating information. The aggregation ECU 160 transmits the turn-off command to the seat memory switch 3 (3a to 3d) when the seat memory switch 3 (3a to 3d) is not operated but is continued until the timer has timed up. As a result, the seat memory switch 3 (3a to 3d) is turned off. As an effect when the seat memory switch 3 (3a to 3d) is turned on and off in this case, the light amount of the light source 11 is gradually increased when the light is turned on, and the light amount of the light source 11 is gradually decreased when the light is turned off.

In addition, the selective turn-on control unit 161 sends turn-on command information when it receives IG switch ON information (information indicating that IG switch has been turned ON), which is not shown, as control for switching the light transmission switches 1 to 5 to the on state. The lighting command information is transmitted to the light transmission switch 1 of the air conditioner system, the light transmission switch 2 of the audio system, the parking assist switch 4, and the panoramic view monitor switch 5. As a result, the light transmission switches 1, 2, 4, and 5 are turned on. At this time, the seat memory switch 3 may also be turned on at the same time. FIG. 1A is a front view of an instrument panel IP in this case. The selective turn-on control unit 161 includes a timer (first timer that will be described later) for turning off the light transmission switches 1 to 5 switched to the on state according to ON information of IG switch. The selective turn-on control unit 161 transmits the turn-off command information to the light transmission switches 1 to 5 when the state in which the light transmission switches 1 to 5 are not operated is continued until the timer has timed up. As a result, the light transmission switches 1 to 5 are turned off. When the seat memory switch 3 is also turned on, the turn-off command information is transmitted to the seat memory switch 3 at the same time as the turn-off command information is transmitted to the light transmission switches 1, 2, 4, and 5. Accordingly, the seat memory switch 3 is also turned off at the same time. FIG. 5A is a front view of the instrument panel IP in this case (in a case where all of the light transmission switches 1 to 5 are in the off state). In this case, it is not limited to turning off all the light transmission switches 1 to 5, and the light transmission switch that needs to be turned on at all times among the light transmission switches 1 to 5 may not transmit the turn-off command information, and may be kept in the turned-on state. An example of the light transmission switch that needs to be turned on all the time in this case is the front defroster switch 1d. In addition, when a light transmission switch is employed as a switch for operating an emergency blinking indicator lamp (so-called hazard lamp), the light transmission switch (light transmission switch for operating an emergency blinking indicator lamp) is also a light transmission switch that needs to be turned on at all times.

Further, the selective turn-on control unit 161, as control for switching the light transmission switch 1 of the air conditioner system (1a to 1k) in the off state to the on state, appropriately sets the set temperature of the air conditioning control device when the body temperature of the occupant is out of the predetermined range when the body temperature of the occupant is received from the air conditioner ECU 110. Further, the selective turn-on control unit 161 transmits lighting command data to the light transmission switch 1 of the air conditioner system (1a to 1k). The predetermined range is a normal predetermined range in the case of being located in a comfortable space. Appropriately setting the set temperature of the air-conditioning control device is, for example, to change the setting so as to lower the set temperature when the body temperature of the occupant is high, and to change the setting so as to increase the set temperature when the body temperature of the occupant is low. As a result, the light transmission switch 1 of the air conditioner system (1a to 1k) is turned on. FIG. 5C is a front view of an instrument panel IP in this case. When the body temperature of the occupant is high, the lighting command information may be transmitted only to the air conditioner switch 1a, the air volume increase switch if, and the set temperature DOWN switch 1k, and only the light transmission switches 1 (1a, 1f, 1k) may be turned on. When the body temperature of the occupant is low, the lighting command may be transmitted only to the air volume increase switch if and the set temperature UP switch 1j, and only the light transmission switches 1 (1f, 1j) may be turned on. After the light transmission switch 1 (1k from 1a) of the air conditioner system is turned on, the light transmission switch 1 of any of the air conditioner systems (1a to 1k) may not be operated for a predetermined period of time. In this case, the light transmission switch 1 of the air conditioner system (1a to 1k) is transmitted with the turn-off command. Thus, the light transmission switch 1 of the air conditioner system (1a to 1k) is turned off.

In addition, the selective turn-on control unit 161 may receive radio wave reception status data of respective sources (AM radios, FM radios, and TV) as control for switching the light transmission switch 2 of the audio system (2a to 2g) in the off state to the on state. In this case, the reception state of the radio wave of the currently selected source may be further deteriorated. In this case, the selective turn-on control unit 161 determines that there is a possibility that the occupant requires switching of the source, and transmits the lighting command information to the light transmission switch 2 of the audio system (2a to 2g). As a result, the light transmission switch 2 of the audio system (2a to 2g) is turned on. FIG. 5D is a front view of an instrument panel IP in this case. In addition, the lighting command may be transmitted only to the light transmission switch 2a, 2b, 2c for selecting the source, and only the light transmission switch 2a, 2b, 2c may be turned on. After the light transmission switch 2 of the audio system (2a to 2g) is turned on, the light transmission switch 2 of any audio system (2a to 2g) may not be operated for a predetermined period. In this case, the light-off command is transmitted from the light transmission switch 2 of the audio system (2*a* to 2*g*). As a result, the light transmission switch 2 of the audio system (2*a* to 2*g*) is turned off.

Further, the selective turn-on control unit 161 determines whether the vehicle is stopped in the parking lot based on the vehicle position information and the vehicle speed information as control for switching the parking assist switch 4 to the on state. When it is determined that the vehicle is stopped in the parking lot, it is determined that there is a possibility that the occupant requests activation of the parking assist function, and the lighting command information is transmitted to the parking assist switch 4. When it is determined that the vehicle has stopped in the parking lot, the current vehicle state is a vehicle state that allows turning on of the light transmission switch according to the present disclosure. As a result, the parking assist switch 4 is turned on. FIG. 5E is a front view of an instrument panel IP in this case. Note that, after the parking assist switch 4 is turned on, when a state in which the parking assist switch 4 is not operated is continued for a predetermined time, the turn-off command information is transmitted to the parking assist switch 4. Thus, the parking assist switch 4 is turned off.

In addition, the selective turn-on control unit 161 determines whether the vehicle is stopped in the parking lot based on the vehicle position information and the vehicle speed information as control for switching the panoramic view monitor switch 5 to the on state. When it is determined that the vehicle is stopped in the parking lot, it is determined that there is a possibility that the occupant requests activation of the panoramic view monitor function, and lighting command information is transmitted to the panoramic view monitor switch 5. As a result, the panoramic view monitor switch 5 is turned on. When it is determined that the vehicle has stopped in the parking lot, the current vehicle state is a vehicle state that allows turning on of the light transmission switch according to the present disclosure. FIG. 5F is a front view of an instrument panel IP in this case. When a state in which the panoramic view monitor switch 5 is not operated is continued for a predetermined time after the panoramic view monitor switch 5 is turned on, the turn-off command information is transmitted to the panoramic view monitor switch 5. Thus, the panoramic view monitor switch 5 is turned off.

Further, the selective turn-on control unit 161 receives a signal from the proximity detection member 16 of each of the light transmission switches 1 to 5, and thereby determines whether or not the hand of the occupant has approached or touched (touched to the skin material 63) the light transmission switches 1 to 5. When there is an approach or contact of this hand, the selective turn-on control unit 161 transmits lighting command information to the light transmission switch. Thus, the light transmission switch that has received the lighting command information is turned on. In this case, only the light transmission switch located closest to the position where the hand is approaching or touching may be turned on, or a plurality of light transmission switches belonging to the same group may be turned on. As the same group, the light transmission switches 1 of the air conditioner system (1*a* to 1*k*) are set (grouped) to the same group (the same group as the air conditioner system) from. The light transmission switches 2 of the audio system (2*a* to 2G) are set to the same group (the same group as the audio system). The seat memory switches 3 (3*a* to 3*d*) are set to the same group (the same group as the seat memory system). That is, for example, there is a case where the occupant's hand may approach or touch the skin material 63 around one of the light transmission switches 1 of the air conditioner system (1*a* to 1*k*) (for example, the air conditioner switch 1*a*). In this case, not only the one light transmission switch (for example, the air conditioner switch 1*a*) but also all of the light transmission switches 1 of the air conditioner system (1*a* to 1*k*) are turned on.

Lighting Control of Light Transmission Switch

Next, lighting control of the light transmission switches 1 to 5 will be described. In the following description, all the light transmission switches 1 to 5 are turned on when IG switch is operated ON.

Figure 4:
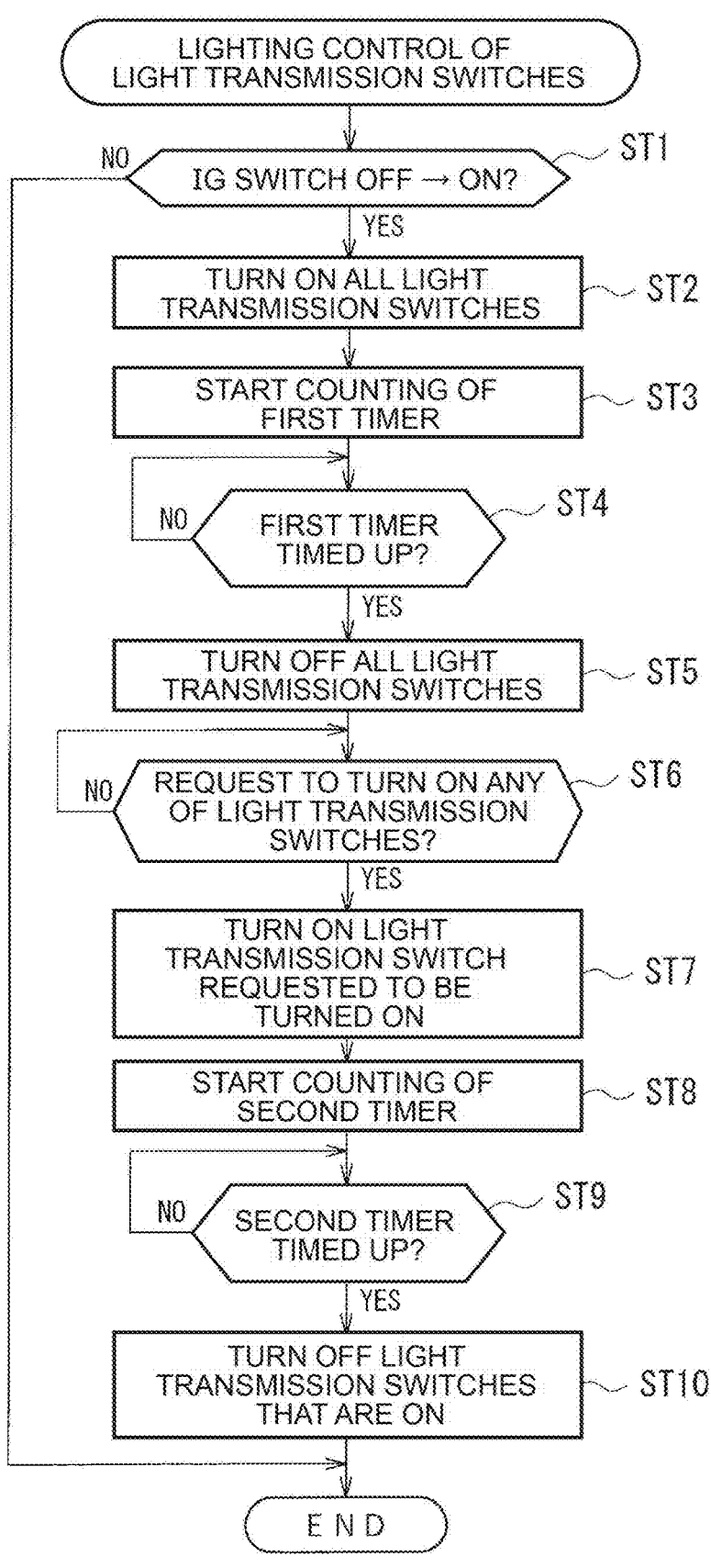
FIG. 4 is a flowchart illustrating a procedure of lighting control of the light transmission switch according to the embodiment.

FIG. 4 is a flowchart showing a procedure of lighting control of the light transmission switches 1 to 5 according to the present embodiment. This flowchart is repeatedly executed at predetermined time intervals.

First, in ST1, it is determined whether or not IG is ON operated from OFF condition. When IG is not ON operated and NO is determined by ST1, the control is terminated as it is.

When IG switch is turned ON and YES is determined by ST1, the process proceeds to ST2, and all the light transmission switches 1 to 5 are turned on. Thus, the occupant can recognize the position of each of the light transmission switches 1 to 5. Further, when all the light transmission switches 1 to 5 are turned on, it can be confirmed that no failure has occurred in the light transmission switches 1 to 5. That is, when there is a light transmission switch that is not lit at this timing, it is possible to recognize that the light transmission switch has failed. It should be noted that the timings at which all the light transmission switches 1 to 5 are turned on in this manner are preferably synchronized with the lighting of the respective lamps on the meter panel associated with ON of IG switch.

In ST3, counting of the first timer provided in the aggregation ECU 160 is started. This first timer is for determining the timing of turning off the light transmission switches 1 to 5 that have been turned on.

ST4 determines whether the first timer has timed up. The light transmission switches 1 to 5 are kept in the on state until the first timer has timed up. When the first timer has timed up and a YES determination has been made in ST4, all the light transmission switches 1 to 5 are turned off in ST5. It should be noted that the timing of turning off all the light transmission switches 1 to 5 as described above is preferably synchronized with the turning off of the respective lamps on the meter panel turned on in accordance with ON of IG switch described above.

In ST6, it is determined whether a turn-on request to turn on any of the light transmission switches 1 to 5 is made. Examples of the turn-on request include, as described above, a case where the body temperature of the occupant is out of the predetermined range (a case where it is determined that a turn-on request is generated for the light transmission switch 1 of the air conditioner system (1*a* to 1*k*)). In addition, as a condition of the turn-on request, there is a case where the reception condition of the radio wave of the currently selected source is deteriorated (a case where it is determined that there is a turn-on request to turn on the light transmission switches 2 of the audio system (2*a* to 2*g*). Further, as a condition of the turn-on request, there is a case where the vehicle is stopped in the parking lot (a case where it is determined that there is a turn-on request to turn on the parking assist switch 4 or the panoramic view monitor switch 5). Further, even when the hand of the occupant approaches or contacts any one of the light transmission switches (contacts the skin material 63), it is determined that a turn-on request for the light transmission switch has occurred.

If there is no turn-on request to turn on any of the light transmission switches 1 to 5 and the determination result of ST6 is NO, the control is continued as it is.

On the other hand, when the turn-on request of any one of the light transmission switches 1 to 5 is generated and YES determination is made in ST6, the process proceeds to ST7, and the light transmission switch corresponding to the turn-on request is turned on. Thus, the occupant can recognize the position of the light transmission switch requesting the operation.

In ST8, counting of the second timer provided in the aggregation ECU 160 is started. This second timer is for determining the timing of turning off the light transmission switches 1 to 5 which are turned on in response to the turn-on request.

ST9 determines whether the second timer has timed up. The on state of the light transmission switch (the on state of the light transmission switch turned on in response to the turn-on request) is maintained until the second timer has timed up. When the second timer has timed up and a YES determination has been made in ST9, the process proceeds to ST10 where the light transmission switch in the on state is turned off, and the control is ended.

Effects of Embodiment

As described above, in the present embodiment, in a situation where a turn-on request is generated by an occupant or in a vehicle state in which lighting is possible, in a case where a corresponding light transmission switch is in an non-on state, the light transmission switch is selectively switched to the on state. Thus, only the minimum required light transmission switch can be turned on, the on state of the light transmission switch satisfying the operation request from the occupant, while obtaining the on state of the light transmission switch suitable for the vehicle state, it is possible to maintain good interior design of the vehicle cabin. This makes it possible to achieve both convenience for the occupant to perform the switch operations and good interior design of the vehicle cabin.

Modified Example

Next, a modification will be described. In this modification, the operation request from the light transmission switch 1 to 5 from the occupant can be acquired by voice. Since other configurations and operations are the same as those of the above-described embodiment, only differences from the above-described embodiment will be described here.

Figure 6:
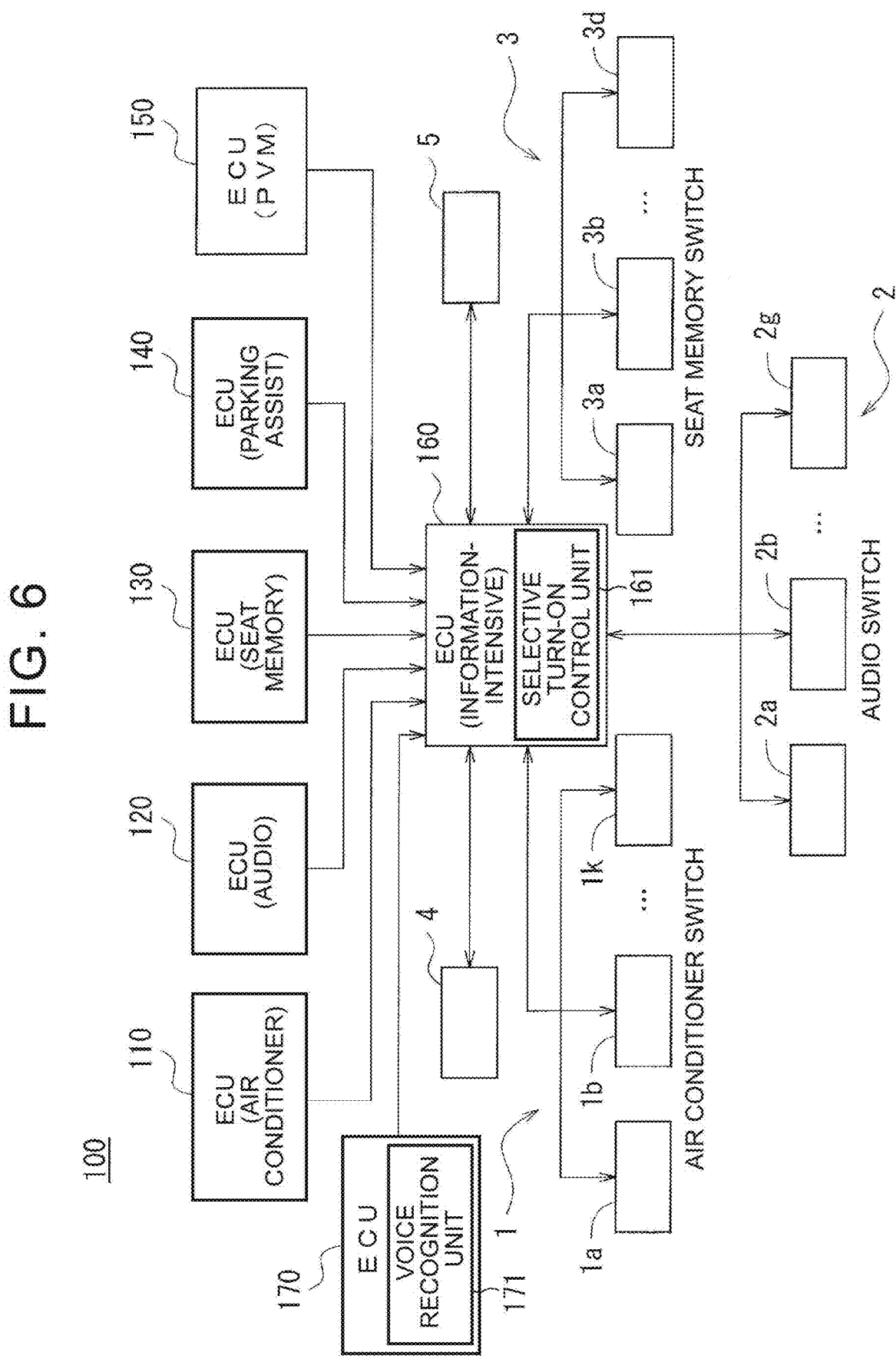
FIG. 6 is a block diagram illustrating a schematic configuration of a control system of a light transmission switch according to a modification.

FIG. 6 is a block diagram illustrating a schematic configuration of the control system 100 of the light transmission switches 1 to 5 according to the present modification.

As shown in FIG. 6, the control system 100 includes a voice recognition ECU 170 connected to a microphone (not shown) for acquiring a voice in the vehicle cabin and configured to acquire voice information. The voice recognition ECU 170 includes a voice recognition unit 171 as a functional unit realized by a control program. When the voice (voice information) of the occupant is acquired from the microphone, the voice recognition unit 171 analyzes the voice. The voice recognition unit 171 determines whether or not the occupant is requesting the operation of the light transmission switches 1 to 5. Further, when the occupant requests the operation of the light transmission switches 1 to 5, the voice recognition unit 171 determines which light transmission switch is requested to be operated. The voice recognition unit 171 transmits the information corresponding to the determination result to the aggregation ECU 160.

Then, the aggregation ECU 160 receives not only the information from ECUs 110 to 150 but also the information from the voice recognition ECU 170, and switches the on state and the off state of the light transmission switches 1 to 5 in response thereto. That is, the voice recognition unit 171 analyzes the voice to determine the light transmission switch that the occupant is requesting to operate, and transmits the lighting command information to the determined light transmission switch, thereby turning on the light transmission switch.

According to this modification, since the request of the occupant is recognized by the voice and the light transmission switch corresponding to the request returns to the on state, the occupant can easily recognize the light transmission switch desired to be operated without using the hand.

Other Embodiments

It should be noted that the present disclosure is not limited to the above-described embodiment and the above-described modification examples, and all modifications and applications encompassed within the scope of the claims and the scope of equivalents thereof are possible.

For example, in the above-described embodiment and the above-described modification, the present disclosure is applied to a configuration in which a plurality of light transmission switches 1 to 5 are built in an instrument panel IP. The present disclosure is not limited thereto, and the present disclosure can be applied as a system in which a light transmission switch is incorporated in a center console, an interior material of a door, or the like, and these light transmission switches are controlled.

Further, in the above embodiment and the above-described modification, the on state and the off state are switched as the states of the light transmission switches 1 to 5. The present disclosure is not limited to this, and the lighting state and the dimmed state (dimmed state in which the amount of transmitted light is smaller than the on state: non-on state) may be switched as the state of each of the light transmission switches 1 to 5. For example, control for reducing the amount of light of the light source 11 is performed. In addition, the on state, the off state, and the dimmed state may be switched.

In the above embodiment and modification, the light sources 11 are turned off to switch the light transmission switches 1 to 5 to the off state. The present disclosure is not limited to this, and the light transmission switches 1 to 5 may be switched to the off state by not allowing the light to pass into the vehicle cabin with the light source 11 on. For example, a configuration in which a shutter member that opens and closes the peeling portion 17*a* is provided is exemplified.

The present disclosure is applicable to a control system of a light transmission switch incorporated in an instrument panel or the like.

What is claimed is:

1. A control system for a light transmission switch that is configured to control turning on of a plurality of light transmission switches, each of the light transmission switches including a translucent region that allows light from a built-in light source to pass through a surface of a vehicle cabin interior material into a vehicle cabin, and an opaque region that blocks passage of the light into the vehicle cabin, the control system comprising a selective turn-on control unit configured to:

determine, for each of the light transmission switches that are in a non-on state, whether a current situation is a situation in which an occupant makes a turn-on request to turn on the light transmission switch, or whether a current vehicle state is a vehicle state that allows turning on of the light transmission switch; and switch at least one light transmission switch selected from the light transmission switches based on a determination result to an on state in which the light is allowed to pass through the translucent region into the vehicle cabin.

2. The control system according to claim 1, wherein the light transmission switches are seat memory switches configured to move a seat according to a seat position stored in advance, and the situation in which the occupant makes the turn-on request is a situation in which the occupant is seated in the seat.

3. The control system according to claim 1, wherein the light transmission switches are light transmission switches for an air conditioning system that are configured to operate an air conditioner, and the situation in which the occupant makes the turn-on request is a situation in which a body temperature of the occupant is out of a predetermined range.

4. The control system according to claim 1, wherein the light transmission switches are light transmission switches configured to enable a driver assist function, and the vehicle state that allows turning on of the light transmission switch is a state in which a vehicle condition that allows enabling of the driver assist function is satisfied.

5. The control system according to claim 1, further comprising a voice recognition unit configured to recognize a voice of the occupant, wherein the situation in which the occupant makes the turn-on request is when the voice of the occupant recognized by the voice recognition unit is a voice requesting to turn on a specific light transmission switch.

\* \* \* \* \*